United States Patent
Cakmak

(10) Patent No.: US 7,703,169 B2
(45) Date of Patent: Apr. 27, 2010

(54) SNOW REMOVAL AND DEICING DEVICE FOR WINDSHIELD WIPER

(76) Inventor: Ertan Cakmak, 470, Lagacé, Dorval, Quebec (CA) H9S 2M4

(*) Notice: Subject to any disclaimer, the term of this patent is extended or adjusted under 35 U.S.C. 154(b) by 1010 days.

(21) Appl. No.: 11/437,783

(22) Filed: May 22, 2006

(65) Prior Publication Data

US 2007/0266516 A1    Nov. 22, 2007

Related U.S. Application Data

(60) Provisional application No. 60/683,318, filed on May 23, 2005.

(51) Int. Cl.
*B60S 1/32* (2006.01)
*B60S 1/34* (2006.01)

(52) U.S. Cl. .............. 15/250.19; 15/250.351

(58) Field of Classification Search ........ 15/250.19, 15/250.001, 250.351, 250.352, 257.01
See application file for complete search history.

(56) References Cited

U.S. PATENT DOCUMENTS

| | | | |
|---|---|---|---|
| 5,469,595 A | 11/1995 | Dara | |
| 5,487,204 A | 1/1996 | Nelson | |
| 5,749,119 A | 5/1998 | Isaac | |
| 6,129,093 A * | 10/2000 | Kelly | 134/6 |
| 6,381,799 B1 | 5/2002 | Leutsch et al. | |
| 6,675,430 B2 | 1/2004 | Hamamoto | |
| 6,721,989 B1 | 4/2004 | Barlow | |
| 2004/0128787 A1 | 7/2004 | Wagner | |

FOREIGN PATENT DOCUMENTS

| | | | |
|---|---|---|---|
| CA | 2212090 C | | 3/1999 |
| EP | 0812744 | * | 12/1997 |
| JP | 05-162616 | * | 6/1993 |

* cited by examiner

*Primary Examiner*—Gary K Graham
(74) *Attorney, Agent, or Firm*—Equinox Protection; Franz Bonsang, Patent Agent

(57) ABSTRACT

A windshield wiper snow removal and deicing device raises a windshield wiper blade away from a windshield, upon which the blade is otherwise maintained in contacting engagement therewith by a wiper biasing spring connected to the wiper arm, such that the blade falls down and impacts the windshield to remove snow and ice accumulated thereon while wiping on the windshield. In a first embodiment, a motor connected to the arm rotates a flap connected thereto to raise the blade above the windshield. In a second embodiment, a cover for a casing attached to the windshield is raised into an idle deployment configuration for engaging the arm and raising the blade above the windshield. In a third embodiment, a body on the arm has a pivoting member to engage an engagement stop on the windshield, with the pivoting member pivoting into a vertical configuration to lift the blade off the windshield.

11 Claims, 8 Drawing Sheets

SNOW REMOVAL AND DEICING DEVICE FOR WINDSHIELD WIPER

CROSS REFERENCE TO RELATED APPLICATIONS

Benefit of U.S. Provisional Application for Patent Ser. No. 60/683,318, filed on May 23, 2005, is hereby claimed.

FIELD OF THE INVENTION

The present invention relates in general to windshield wipers, more specifically to a snow removal and deicing device for a windshield wiper and mountable thereon.

BACKGROUND OF THE INVENTION

Driving in inclement winter weather is a hazardous proposition for a wide variety of reasons, not-the least being the need for clear and unobstructed visibility. Blizzards, ice storms and the like induce a good deal of stress to the motor vehicle driver that is only increased by a lack of a clear view of the road ahead. To some extent windshield wipers do a commendable job of keeping the windscreen clear but in extreme weather situations they tend to become clogged with a build-up of ice and frozen rain thereby reducing or eliminating their intended cleaning efficiency. In such instances an imprudent driver may try to remedy the situation by attempting to grope at a moving windshield blade and snap it against the windscreen in the hope of dislodging the accumulating ice while driving. This practice is clearly both impractical and dangerous as the attention of the driver is distracted from the primary task of driving safely and responsibly thus making him a hazard to both himself and others. A more responsible yet not necessarily much safer alternative would be to bring the vehicle to a stop at the side of the road, disembark and manually free the ice or snow from the wipers. The potential danger existing in this solution is that in stopping and exiting the vehicle in extreme weather conditions, the driver puts himself and his vehicle at risk from fellow motorists driving in the same extreme conditions. Ideally, a device that could mechanically and automatically dislodge ice build-up from windshield wiper assemblies without physical human intervention while said vehicle was in motion would be welcome.

Many attempts were made as shown in U.S. Pat. No. 5,749,119 granted to Isaac on May 12, 1998 for a "windshield wiper blade deicer" used to alternately raise the two wiper blades with a motor/shaft assembly when in the stowed non-operating position, and in U.S. Pat. No. 6,381,799 granted to Leutsch et al. on May, 2002 for a "windshield wiper with blade lifting mechanism" located within the wiper mounting bearing housing and used to raise the wiper blade away from the windshield via a ramp cooperating with a rocker arm when the wiper is in the stowed non-operating position. Canadian Patent application No. 2,212,090 of Vanderzweep and published on Mar. 5, 1999 discloses a "windshield wiper lifting device" used to lift the wiper blade when the wiper is not being used (static mode) at the lower end of its displacement path, and eventually, for one embodiment, when the wiper is being used (dynamic mode). All above devices only operate while the wiper blade is not used (static mode) and in the lower most position on the windshield where the blade pushes all the snow it wipes off from the windshield during its return segment of travel path.

US Patent application publication No. 2004/0128787 to Wagner published on Jul. 8, 2004 discloses a "windshield wiper blade slapper apparatus" that includes a solenoid activated push-pull rod connected to the wiper bearing housing and the wiper arm to successively raise and lower the latter during operation of the wiper on the windshield. Although the above apparatus can operate at any position of the wiper blade along its wiping travel path during the use of the wiper, it is relatively complex to install by retrofit on existing wiper blades since it requires special tools and modification of the existing wiper mounting bearing housing, especially in order not to interfere with the existing mechanism allowing for the wiper blade to be manually raised during cleaning and/or maintenance thereof.

Accordingly, there is a need for an improved snow removal and deicing device for windshield wiper.

SUMMARY OF THE INVENTION

It is therefore a general object of the present invention to provide an improved snow removal and deicing device for windshield wiper.

It is therefore a general object of the present invention to provide a powered windshield wiper de-icing device that obviates the above-noted disadvantages and can be provided in a varying degree of preferred embodiments to best suit the demands determined by specific weather situations.

An advantage of the present invention is that the snow removal and deicing device for windshield wiper is activated by an electric motor located in the housing of the device.

Another advantage of the present invention is that the snow removal and deicing device for windshield wiper functions in tandem with the swiping action of the windshield wiper assembly.

Yet another advantage of the present invention is that the snow removal and deicing device for windshield wiper automatically raises and releases the windshield wiper assembly allowing said assembly to snap back against the windshield resulting in the dislodgment of built-up ice/snow on impact.

Another advantage of the present invention is that the snow removal and deicing device for windshield wiper allows for the safe dislodgment of built-up ice from the wiper assembly while the vehicle is still in motion.

Still a further advantage of the present invention is that the snow removal and deicing device for windshield wiper can be mounted on conventional windshield wiper assemblies thereby precluding the need for the re-tooling said assemblies.

Still another advantage of the present invention is that the snow removal and deicing device for windshield wiper is easily retrofitted and adaptable to any size of windshield wiper blade.

Hence the advantages of the preferred embodiments of the present invention become obvious in that they involve a duality of de-icing devices based on a similar mechanical process which initially involves raising of the spring-loaded windshield wiper assembly away from the windshield by virtue of rotating or leveraging aspects inherent in the embodiments of the present invention. Once the windshield wiper assembly has reached maximal distance from the windshield as determined by mechanisms inherent in the de-icing device, it is released by said device and springs back against the windshield, the ensuing impact resulting in the dislodging of ice/snow build-up. The cycle is easily repeated as needed.

According to a first aspect of the present invention, there is provided a windshield wiper snow removal and deicing device for raising a windshield wiper blade mounted on a wiper arm away from a windshield, upon which the wiper blade is otherwise maintained in abutting contact therewith by a wiper biasing spring connected to the wiper arm, such that the wiper blade falls down and impacts the windshield, the wiper blade defining a wiping plane in which the wiper wipes snow and ice on the windshield in abutting contact therewith, the device comprises:

a motor mountable on the wiper arm;

a rotating shaft oriented substantially parallel to the wiping plane and rotated by the motor when the motor is actuated;

at least one flap member freely rotatably mounted on the rotating shaft and oriented generally radially thereto for selective abutting contact on the windshield; and a motion transmitting member connected to the rotating shaft for imparting rotation, when the motor is actuated, of the flap member from the rotating shaft from a horizontal rest position in which the flap member is substantially parallel to the windshield, the wiper blade passing unobstructed through the wiping plane in contacting engagement with the windshield when the flap member is in the horizontal rest position, and a vertical working position in which the flap member abuttingly engages the windshield and raises the wiper blade thereabove, the motion transmitting member allowing partial free rotation of the flap member from the vertical working position back to the horizontal rest position.

According to a second aspect of the present invention, there is provided a windshield wiper snow removal and deicing device for raising a windshield wiper blade mounted on a wiper arm away from a windshield, upon which the wiper blade is otherwise maintained in abutting contact with the windshield by a wiper biasing spring connected to the wiper arm, such that the wiper blade falls down and impacts the windshield, the wiper blade defining a wiping plane in which the wiper wipes snow and ice on the windshield in abutting contact therewith, the device comprises:

a main body mountable on one of the wiper arm and the windshield, the main body having a pivoting member pivotally mounted thereon to selectively pivot between a stowed configuration in which displacement of the wiper arm with the wiper blade in abutting contact with the windshield remains unobstructed and a deployed configuration in which the pivoting member momentarily engages the other one of the wiper arm and the windshield to momentarily raise the wiper blade away from the windshield so as to have the wiper blade falling back and impacting on the windshield.

In one embodiment, the main body is a casing mountable on the windshield and the pivoting member is a casing cover hingeably mounted on the casing, the device further includes:

a cover lifting mechanism for moving said cover between a stowed unused configuration in which the wiper arm passes unobstructed over said device during forward displacement thereof with the wiper blade in abutting contact with the windshield and a deployed idle configuration cover in which said cover is engageable by the wiper arm during said forward displacement thereof on the windshield to pivot said cover relative said casing upwardly away from the windshield with the wiper arm in abutting contact therewith, thereby raising the wiper blade away from the windshield, until the cover reaches a fully deployed configuration in which the wiper arm is released from said cover and is drawn back towards the windshield by the wiper biasing spring, thereby returning the wiping blade to abutting contact with the windshield.

In one embodiment, the main body is releasably mountable on the wiper arm and includes a retaining means, the device further includes an engagement stop securable to the windshield, the pivoting member being pivotally mounted on the main body and facing the windshield when the wiper blade is in abutting contact therewith during forward and reverse displacement thereof through the wiping plane by the wiping arm, the retaining means releasably retaining the pivoting member in a stowed disengaged configuration in which the main body passes over said engagement stop with the wiper blade remaining in contacting engagement with the windshield, the pivoting member being selectively engageable by abutting contact with the engagement stop in a deployed first engagement configuration therefor during the forward displacement and a deployed second engagement configuration during the reverse displacement to freely pivot the pivoting member between the first and second engagement configurations through a deployed vertical configuration in which the pivoting member is oriented substantially perpendicularly to the windshield, thereby raising the wiper arm and the wiper blade away from the windshield, the pivoting member being releasable from the disengaged configuration into the first engagement configuration.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE PREFERRED EMBODIMENTS

With reference to the annexed drawings the preferred embodiments of the present invention will be herein described for indicative purpose and by no means as of limitation.

Figure 1:
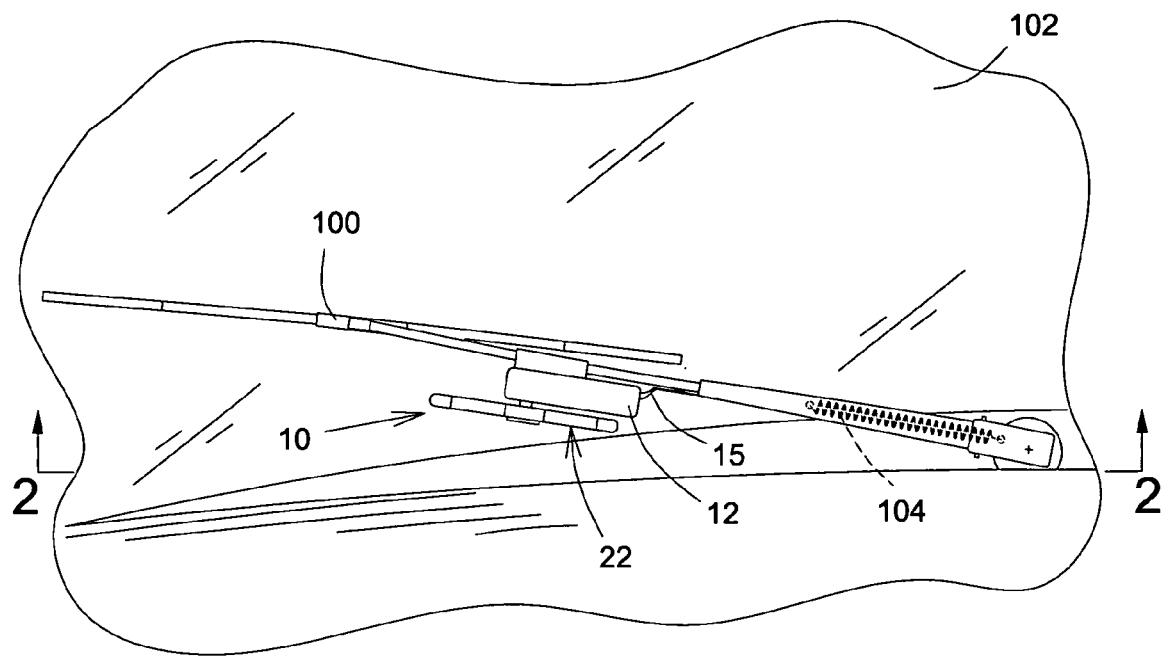
FIG. 1 is a top plan view of a snow removal and deicing device, in accordance with a first embodiment of the invention, for a windshield wiper in accordance with an embodiment of the present invention installed on a conventional windshield wiper assembly in relation to a windshield.
Figure 2:
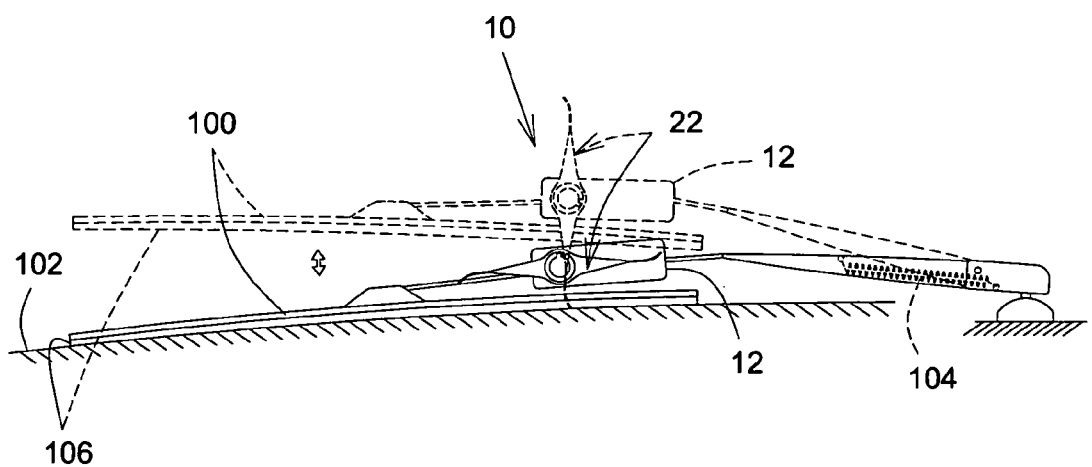
FIG. 2 is a front elevation view of the embodiment of FIG. 1, showing in solid line the device and the wiper assembly in a contact position and, in broken line showing the same in a raised position.
Figure 3:
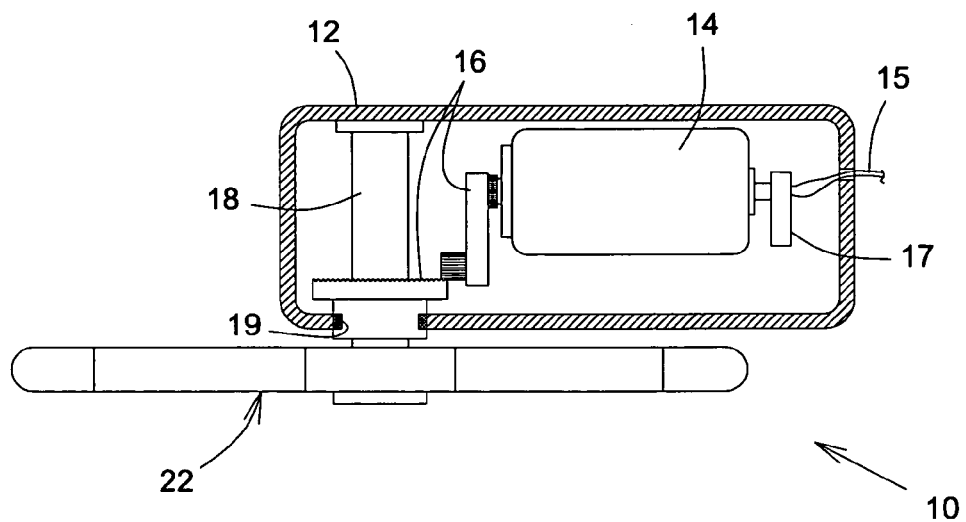
FIG. 3 is an enlarged top section view of the motor and a drive assembly situated within motor/drive housing of the embodiment of FIG. 1.
Figure 4A:
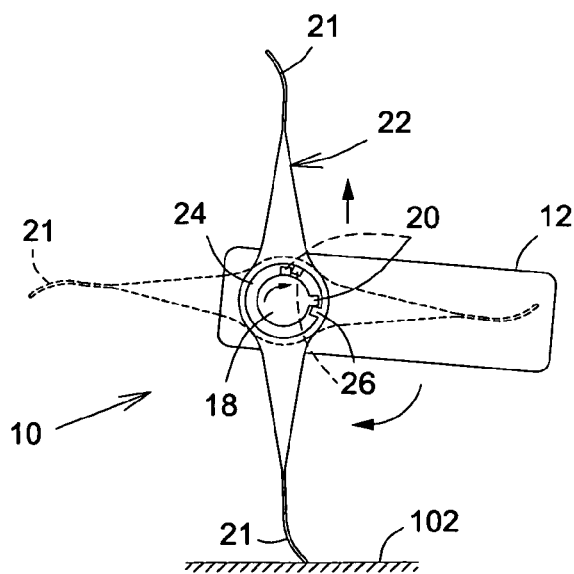
FIG. 4a is a partially sectioned enlarged front view of the cog ring and axle assembly that propels the rotary flap of the embodiment FIG. 1, showing a horizontal rest position of the flap in broken lines and a vertical working position of the flap in solid lines.

FIGS. 1 and 2 show a snow removal and deicing device or device 10 for windshield wiper 100 in accordance with a first embodiment of the present invention. The embodiment 10 is mounted at a typical location on a windshield wiper assembly 100 in relation to the windshield 102. As illustrated in FIG. 3 the de-icing device 10 is comprised of a motor drive housing 12 mountable on the wiper 100 via conventional fastening means that encases the motor 14 and the drive assembly 16 and is typically made out of durable weather-resistant plastic or the like. The interior of the motor drive housing 12 is preferably accessible and weather-sealed at the point of access. Both the motor 14 and the drive assembly 16 are of a standard well known in the art. Referring to FIGS. 3, 4, and 4a, as the lattermost component of the drive assembly 16, the drive axle 18, having a drive axle cog 20 at a free end thereof, sealably protrudes through a housing opening 19 to engage a rotary flap assembly 22 freely rotatably mounted thereon. Although not specifically described herein, the motor 14 is typically powered by an external power source such as the vehicle battery or the like (not shown) through electrical wires 15 running along and under the wiper assembly 10. The flap assembly 22 includes two rotary flaps 21, generally flexible and made out of resilient material that would not damage the windshield surface under successive engagement therewith, mounted on a centrally located drive collar 24. The drive collar 24 is provided with a drive collar cog 26 that cooperatively engages with the drive axle cog 20 when the mechanism 10 is in use. The configuration of drive axle cog 20 and drive collar cog 26 allows for a staggered rather than continuous rotation of the collar 24 and the flaps 21 thereby effecting two distinct impact events, in which a flap 21 impacts windshield, per complete rotation of the drive axle 18.

Figure 4B:
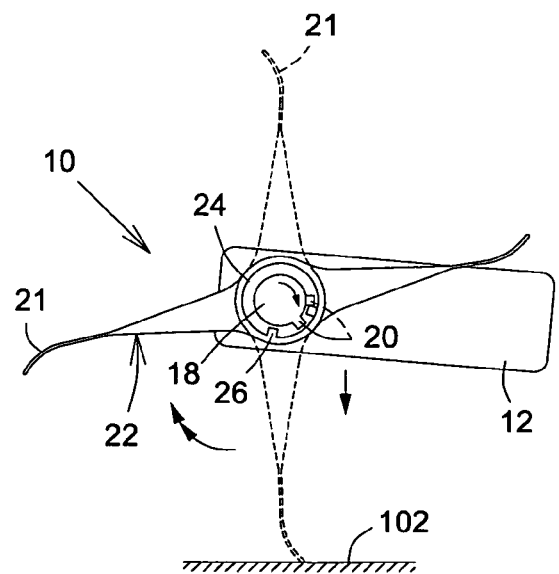
FIG. 4b is a view similar to FIG. 4a, showing the vertical working position of the flap in broken lines and the following return in the horizontal rest position of the flap in solid lines with the flap rotating faster than the flap drive axle.

Operation of the device 10 is explained with reference to FIGS. 4a, 4b, and FIG. 1. During operation, each impact event typically follows a three-part cycle, the first part, or wiper raising part, extending from an initial horizontal rest position with the flaps 21 at rest and substantially parallel to the windshield 102 (shown in broken lines in FIG. 4a) to a second vertical working position with the flaps 21 being substantially vertically oriented and one of them in abutment contact with the windshield 102 to momentarily support the wiper assembly 100 raised above the windshield 102 in a spaced apart relationship thereto (shown in solid lines in FIG. 4a), while the axle cog 20 remains in abutment contact with and pushes the collar cog 26. The second part extends from the second vertical working position (shown in broken lines in FIG. 4b) to a third horizontal rest position of the flaps 21 (shown in solid lines in FIG. 4b), corresponding to the initial horizontal rest position, under the action of the existing biasing spring 104 of the wiper assembly 100 that forces the flap assembly 22 to rotate faster than the drive axle 18 (shown by the double arrow) and cause the flexible rubber blade 106 or the like of the wiper assembly to impact on the windshield 102. The third and last part extends during the time needed for the axle cog 20 to catch up to the collar cog 26 'waiting' in its third horizontal rest position and be in a proper position to restart another cycle; which may be repeated as needed, while the wiper assembly 10 is either operating and wiping material off the windshield 102 or non-operating and resting.

Obviously, when the motor 14 is turned off, a mechanism (not shown) allows the drive axle 18 to reach a predetermined position (or one of predetermined positions) allowing the flap assembly 22 to return and remain in its initial horizontal rest position, as well known in the art and similarly used for the conventional windshield wiper 100 itself when the wiper 100 remains powered until it reaches its rest position after the power switch has been turned off.

Typically, the device 10 includes a vibrating member 17, shown in FIG. 3, connected to the motor 14 that makes the whole device 10 as well as the wiper 100 vibrate slightly when the motor 14 is on in order to help the removal of ice and/or snow from the windshield wiper 100.

Alternatively, although not illustrated, it would be obvious to one skilled in the art that the motor 14 could be located closer to the pivot attachment of the wiper arm 108 and have a longer shaft that would connect to the drive assembly 16, without departing from the scope of the present invention. This would have the advantage to bring the flap assembly 22 closer to the longitudinal axis of the wiper arm 108 for increased efficiency of the device 10.

FIGS. 5 through 10 depict a second embodiment 40 of a snow removal and deicing device in accordance with the present invention.

Figure 5:
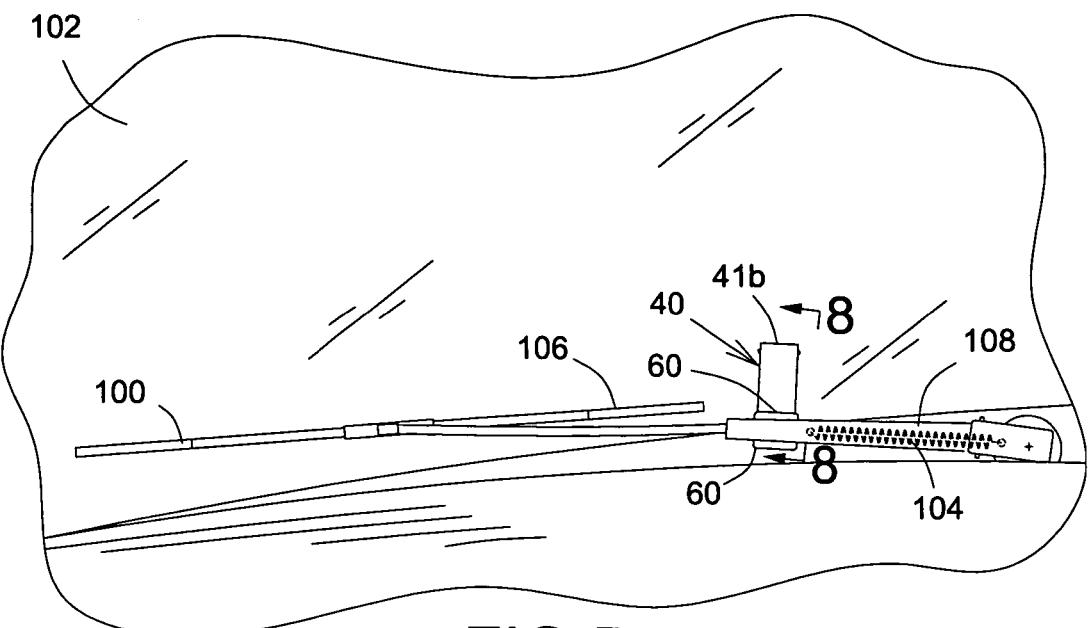
FIG. 5 is a top plan view of a snow removal and deicing device for windshield wiper in accordance with a second embodiment of the present invention installed on a conventional windshield wiper assembly in relation to its location on a windshield.

Referring more specifically to FIG. 5, the windshield wiper deicing device 40 is illustrated in its preferred location, that being mounted on the windshield 102 adjacent and beneath the wiper arm 108 of the windshield wiper assembly 100 inwardly away from the wiper blade 106 when the wiper assembly 100 is at its lowermost position on its travel path.

Figure 6:
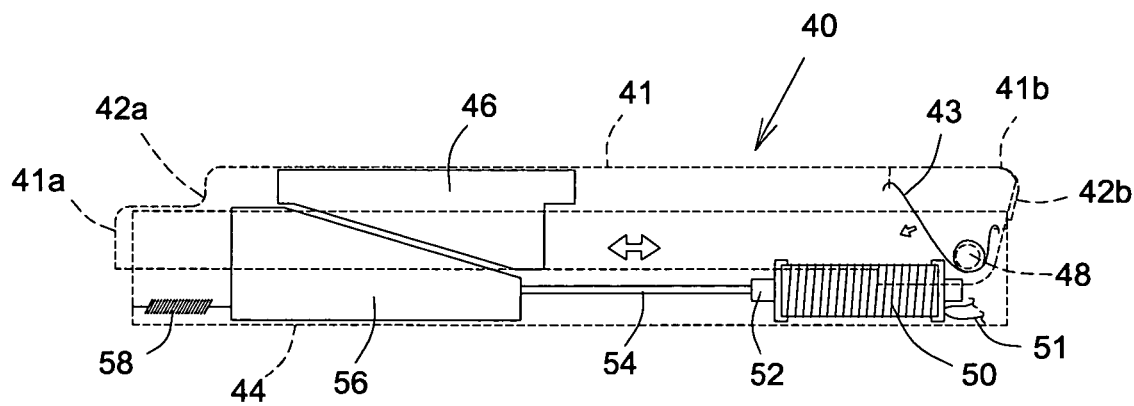
FIG. 6 is an enlarged side sectioned view of the embodiment of FIG. 5, showing the embodiment in the stowed unused configuration.
Figure 7:
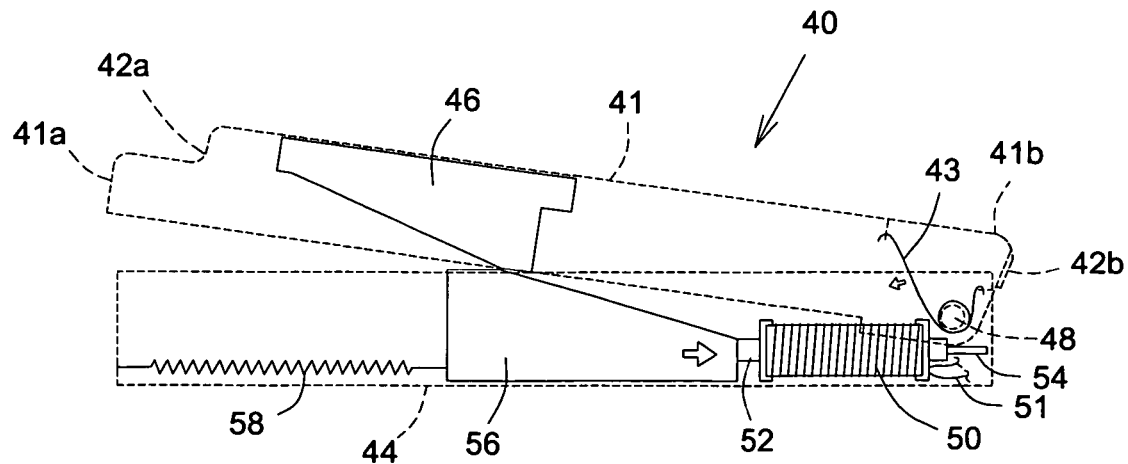
FIG. 7 is a view similar to FIG. 6, showing the embodiment of FIG. 5 in the deployed idle configuration.
Figure 8:
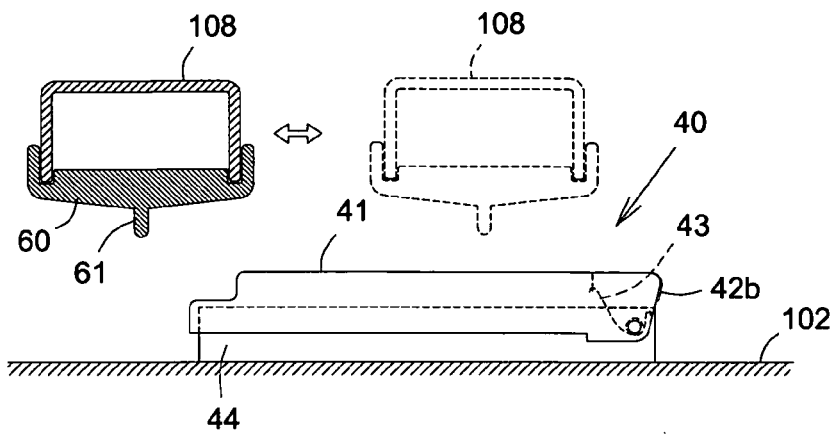
FIGS. 8, 9 and 10 are partially sectioned enlarged side views of the second embodiment of FIG. 5, showing the successive functioning steps of the embodiment before activation thereof in the stowed configuration, at engagement with the wiper arm in the idle configuration, and at the end of the deployment course in a fully deployed configuration with the wiper arm being released to drop down toward the windshield surface (as shown in broken lines), respectively.

Now referring to FIGS. 6 and 7, the device 40, depicted in broken lines to ease the illustration of the internal components thereof, includes a pivoting member such as a generally elongate upper cover 41 provided with a molded wiper arm retention lip 42a generally extending along the entire width thereof at the upper leading edge 41a and a cover stop 42b located at the opposed trailing edge 41b of the upper cover 41. The upper cover 41 is also provided with a fixed wedge 46 that is firmly attached to the underside thereof in adjacent the leading edge 41*a* with the lower surface tapering downwardly in a direction leading toward the trailing edge 41*b*. A generally elongate lower casing 44 or main body hingeably support the cover 41 and houses various mechanical components of a cover lifting mechanism being a solenoid 50 well-known in the art, a wedge buffer 52, a wedge guide shaft 54, a sliding wedge 56 having an upper surface tapering upwardly in a direction leading toward the leading edge 41*a* and a biasing wedge retention spring 58. The upper cover 41 and the lower casing 44 are typically form-fitted and are hingedly attached to one another adjacent the trailing edge 41*b* via a transversal casing pivot shaft 48 which acts doubly as a support for a biasing cover retraction spring 43 biasing the cover 41 in a stowed unused configuration covering the lower casing 44, as shown in FIGS. 6 and 8. When in this stowed configuration, the device 40 does not provide any obstruction to the wiper arm 108 passing there above in both forward and return directions during its normal wiping operation on the windshield 102, as shown in broken lines in FIG. 8.

In operation, the cover lifting mechanism of the device 40 is typically activated electrically or the like using a conventional power switch (not shown) connected between the solenoid 50 via electrical wires 51 and an external power source (not shown), causing the solenoid 50 to draw the wedge guide shaft 54 and the sliding wedge 56 connected thereto against the action of the wedge retention spring 58 toward the trailing edge 41*b* up against the wedge buffer 52 (shown in FIGS. 7, 9 and 10) from their retracted position (shown in FIGS. 6 and 8), and holding the sliding wedge 56 in place. Simultaneously, this slidable action of the sliding wedge 56 located under the fixed wedge 46 causes the latter to rise by the pivoting of the upper cover 41 about the pivot shaft 48, because of the cooperation of their respective tapered upper and lower surfaces in sliding abutment with one another. This raising displacement of the leading edge 41*a* of the cover 41 against the action of the cover retention spring 43 moves the device 40 into a deployed idle configuration (shown in FIGS. 7 and 9) in which the wiper arm retention lip 42*a* is positioned to provide obstruction to the normal forward displacement of the wiper arm 108 on the windshield 102 by being engageable thereby. In order first not to damage either the wiper arm 108 or the retention lip 42*a* during multiple contacts between the two during the service lives thereof, and second to increase the adaptability of the device to different types and seizes of existing wiper arms, a model-specific adapter bracket 60, preferably releasably fit onto the underneath of the wiper arm 108, is typically provided, preferably via a downwardly protruding ridge 61, to engage with the retention lip 42*a*.

Figure 9:
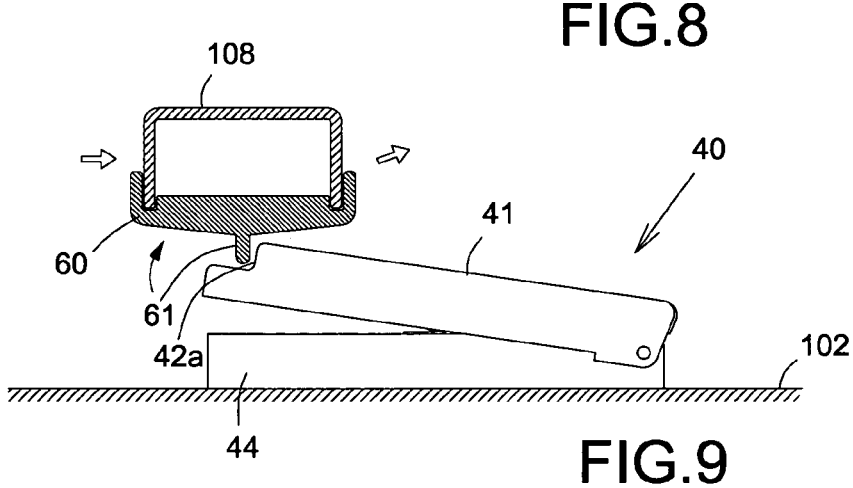

Once the wiper arm retention lip 42*a* is engaged by the model-specific adapter bracket 60 as shown in FIG. 9, the forward swiping action of the window wiper assembly 100 causes the upper cover 41 to further pivot thus raising the windshield wiper assembly 100 away from the windshield 102. When reaching its fully deployed configuration as almost shown in FIG. 10, the cover stop 42*b* gets into abutment contact with the lower casing 44 to stop the pivoting thereof such that the bracket 60 is freed (or jumped off) from the wiper arm retention lip 42*a* resulting in the windshield wiper 100 snapping downward toward the windshield 102 (as shown in broken lines in FIG. 10) to impact thereon by virtue of the wiper biasing spring 104 inherent in the wiper assembly 100, the horizontal distance traveled by the wiper 100 depending on the wiping speed thereof. Once freed from the wiper assembly 100, the upper cover 41 is withdrawn to its idle deployed position by virtue of the cover retraction spring 43. On its return wiping path, the wiper arm 108 will slightly slide upward when abutting the angled upper side of the cover 41 before returning back into its lowermost position shown in FIGS. 5 and 8. The above wiper snapping procedure may be repeated as the situation requires, as long as the solenoid 50 remains powered.

When the use of the device 40 is not required anymore, the solenoid 50 is powered off, and the sliding wedge 56 and the guide shaft are withdrawn therefrom into their retracted position under the biasing of the wedge retention spring 58 and the cover 41 resumes at the stowed rest position.

Figure 10:
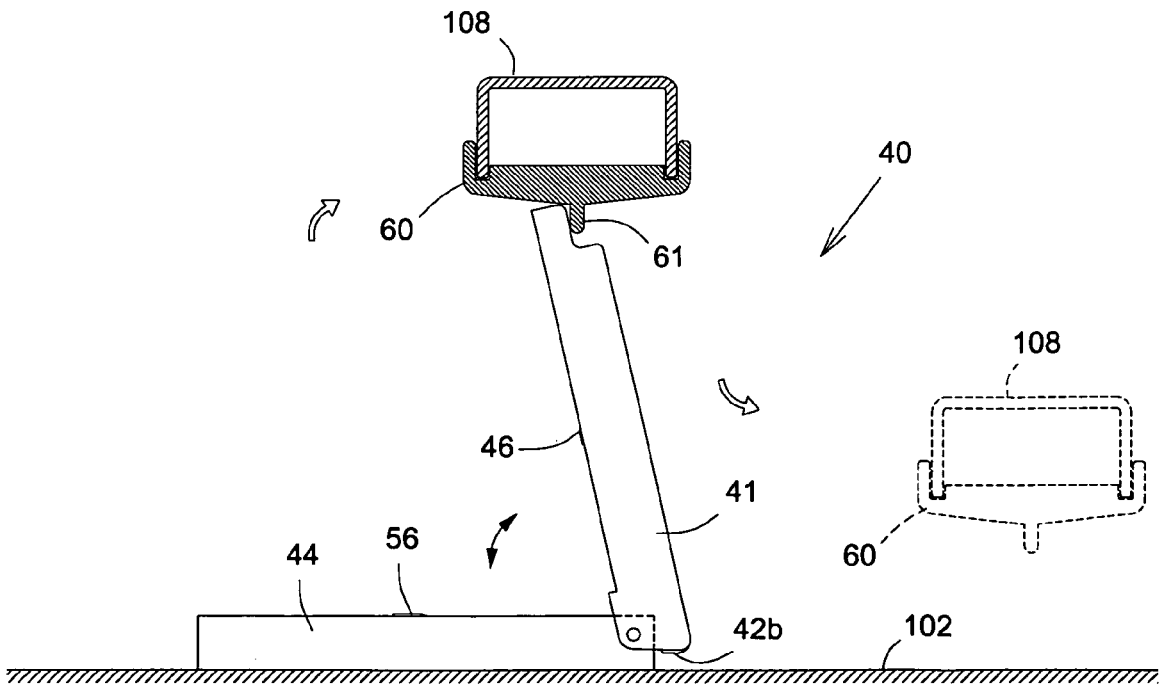

Typically, the device 40 would include some features (not shown) to protect it against snow and/or ice accumulation thereon and especially therein when being in the fully deployed configuration, as shown in FIG. 10.

Although not specifically shown, it would be obvious to one skilled in the art that the device 40 could be installed at any other location along the path of the wiper arm 108, and could include a different cover lifting mechanism (such as a vertically oriented pull rod or the like) to maintain the cover in the deployed idle configuration of FIGS. 7 and 9, without deviating from the scope of the present invention.

Figure 11:
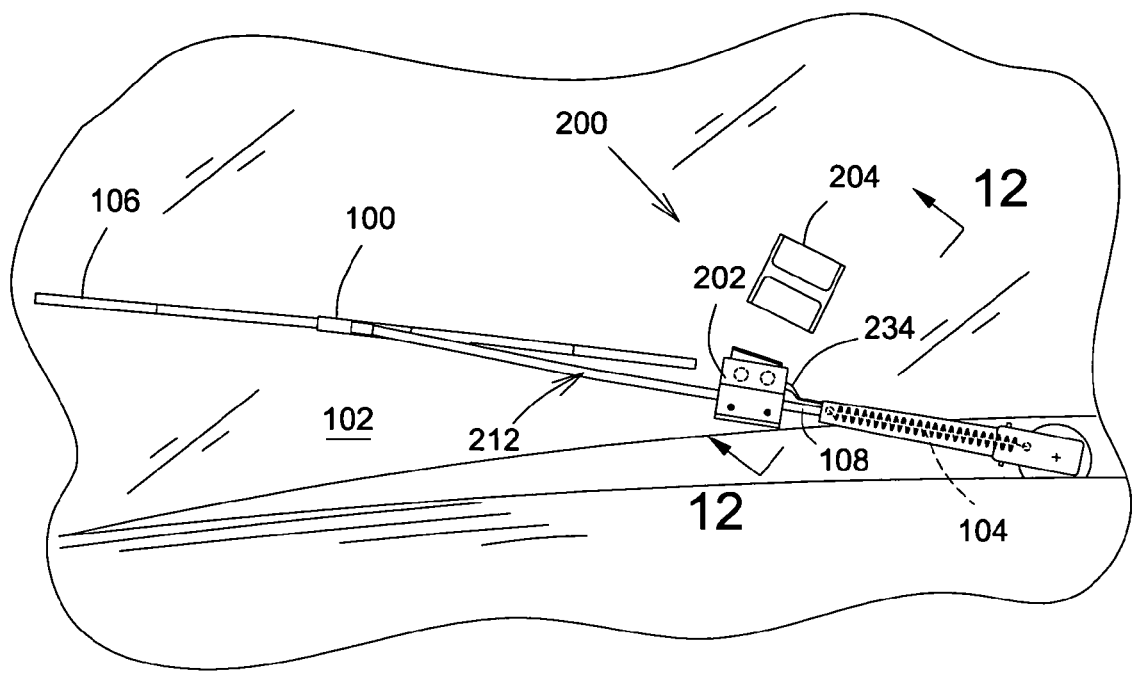
FIG. 11 is a top plan view of a snow removal and deicing device for a windshield wiper in accordance with a third embodiment of the present invention installed on a conventional windshield wiper assembly in relation to its location on a windshield.
Figure 12:
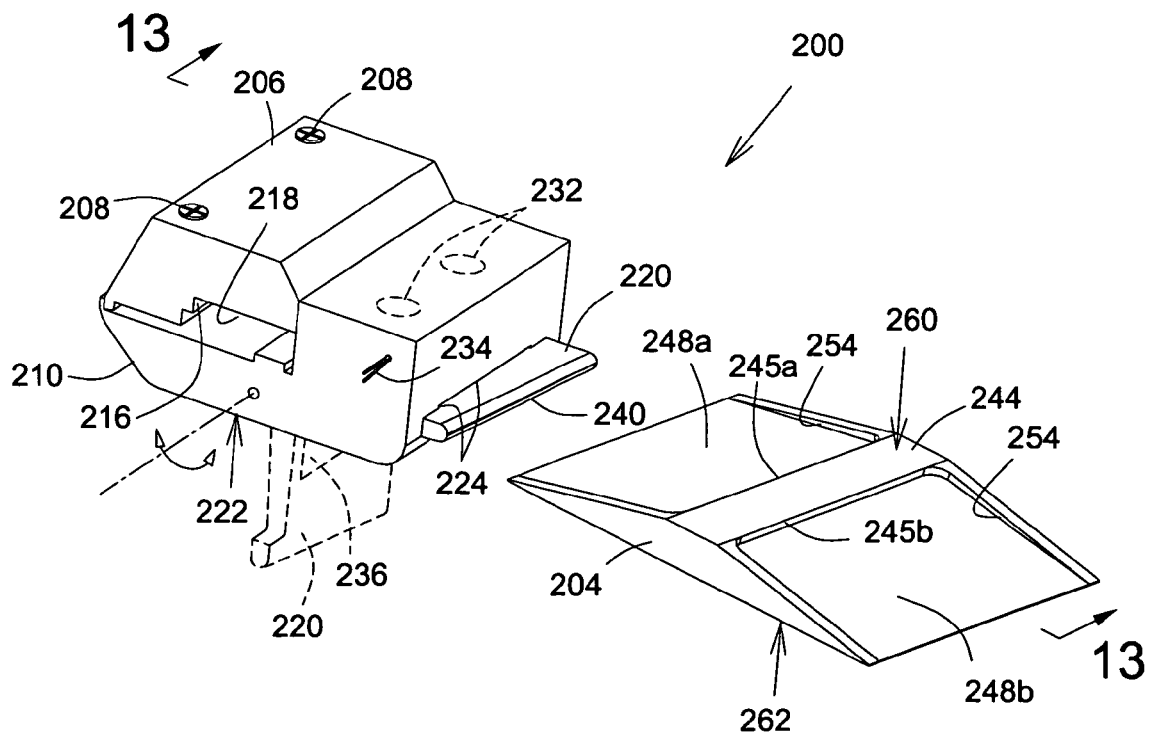
FIG. 12 is an enlarged view of the embodiment shown in FIG. 11, taken along line 12-12.
Figure 12A:
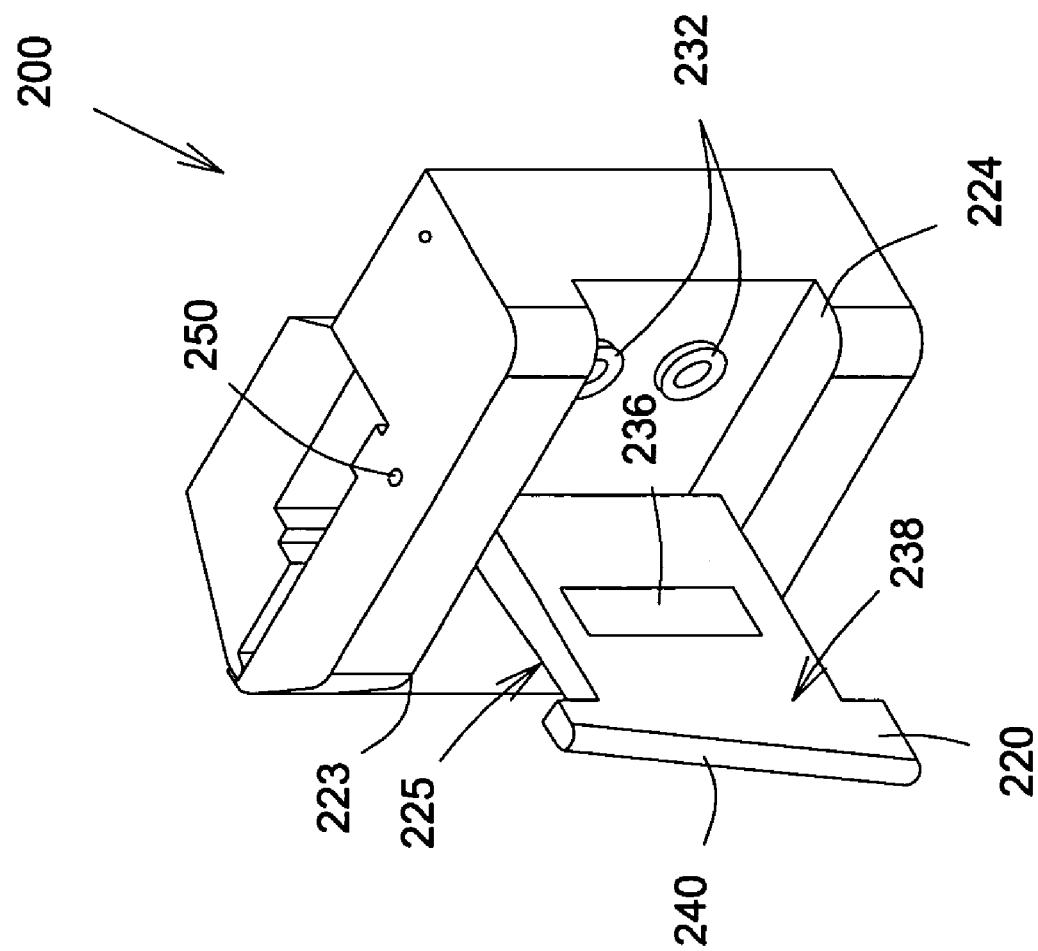
FIG. 12a is a side perspective view of the main body for the snow removal and deicing device shown in FIG. 11.

Turning now to FIGS. 11 and 12, therein is shown a snow removal and deicing device 200 for a windshield wiper 100 in accordance with a third embodiment of the present invention. As shown, device 200 is composed of main body 202, attached to wiper blade, and engagement stop 204 attached to windshield 102 within a wiping plane defined by wiper blade 106 when in contacting engagement with windshield for wiping the snow and ice, the wiper blade 106 extending from and being displaced through wiping plane by wiper arm 108. Although the engagement stop 204 could be located anywhere along the path of travel of the wiper arm 108, in register with the main body 202, it is typically located adjacent either ends of the path of travel of the wiper arm 108.

Main body 202 is fixedly attached to wiper arm 108 by a removable main body cover 206, extending over top side 212 of wiper arm 108 in abutting contact therewith, which is removably attached by cover screws 208 to the body 210, which extends under bottom side 214, generally opposite top side 212 and proximal windshield 102, of wiper arm 108 in abutting contact therewith. As shown, when cover 206 is attached to body 210, cover recess 216 defines an arm aperture 218 through which wiper arm 108 extends in abutting contact with cover 206 and body 210, securely held in place, along with cover 206, by cover screws 208. Cover 206, notably cover recess 216, and body 210 may be adapted to fit a specific model of wiper 100.

Body 210 has a pivoting member 220 pivotally hingeably mounted thereon by a member pin 250 and extending from an underside 222 thereof situated proximal to windshield 102 and which generally faces theretowards. As shown in FIGS. 13, 14, 15, 16, and 17, pivoting member 220 is generally freely rotatable, sequentially, between a stowed disengaged configuration 225, through a deployed first horizontal engagement configuration 226 to a generally deployed vertical configuration 228 to a deployed second horizontal engagement configuration 230, and back again from configuration 230, through configuration 228 and then configuration 226, to disengaged configuration 225.

Figure 13:
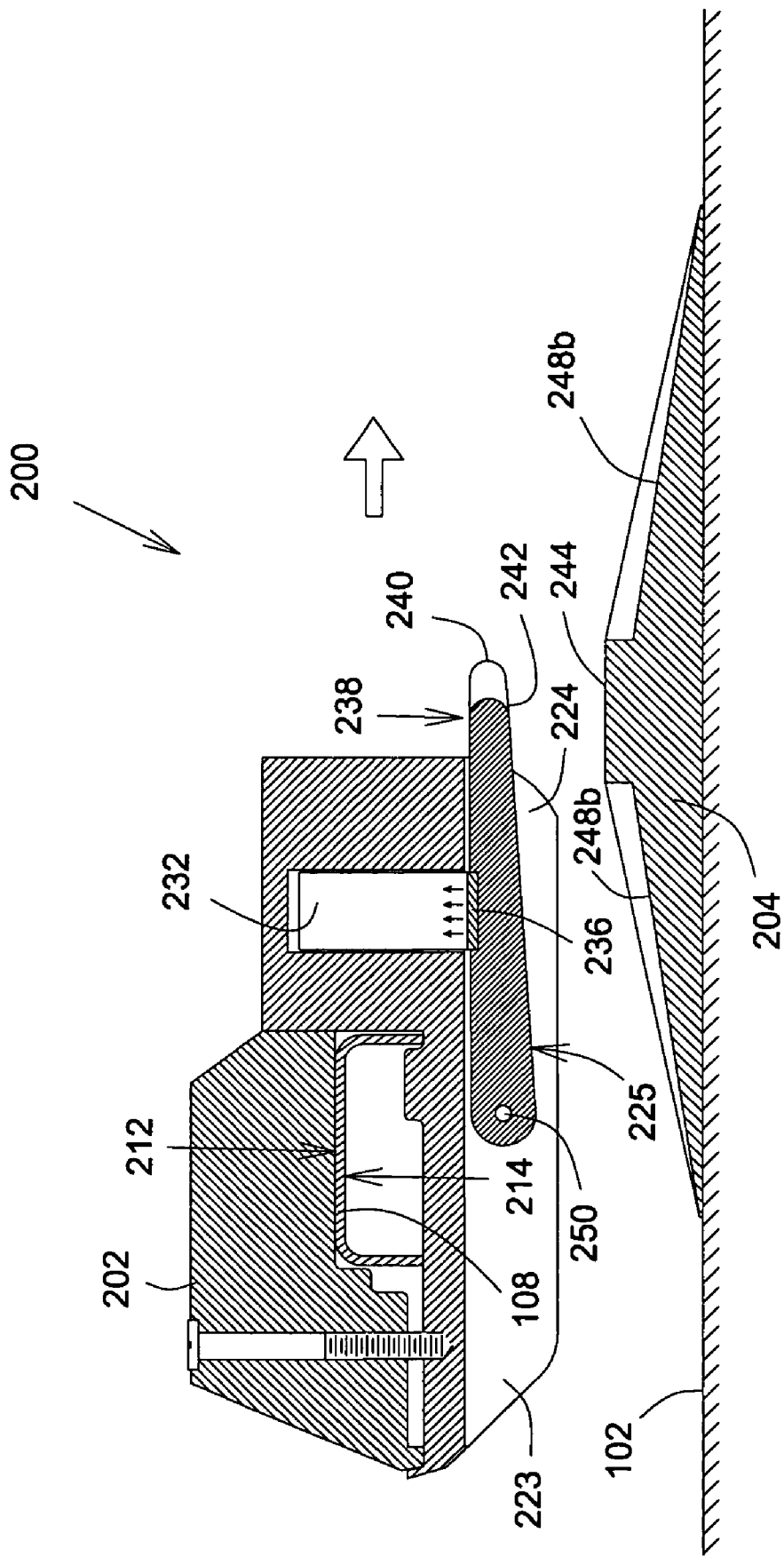
FIG. 13 is a side view of the a snow removal and deicing device, taken along line 13-13, with a pivoting member thereof in a disengaged configuration.
Figure 14:
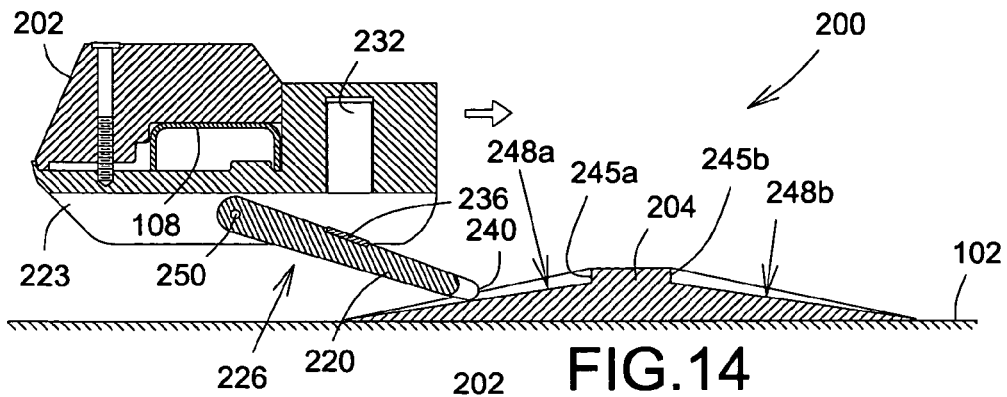
FIG. 14 is a side view of the a snow removal and deicing device, taken along line 13-13, with the pivoting member thereof in a first engagement configuration.

In disengaged configuration 225, shown in FIG. 13, pivoting member 220 is disposed, essentially parallel the windshield 102, in a first member recess 224 and is retained therein by a retaining means. Retaining means, in the third embodiment, is at least one electromagnet 232 disposed within first member recess 224 and connected by wires 234 to a power source, not shown, and a metal plate 236 mounted on member 220, preferably on a first member wall 238 situated proximal electromagnet 232 and facing theretowards when pivoting member 220 is in disengaged configuration 225. When member 220 is in disengaged configuration 225, electrical current is provided, i.e. circulated, to electromagnet 232 which exerts magnetic force on metal plate 236, causing metal plate 236, and thereby member 220, to be rigidly held in first member recess 224, thus magnetically holding member 220 in disengaged configuration 225. When a user wishes to remove snow and ice from wiper blade 106, circulation of flow of electrical current to electromagnet 232 is terminated, thus terminating electromagnetic force exerted thereby. Accordingly member 220 may pivot freely in first member recess 224 and is drawn by gravity, i.e. falls, away from, and at least partially out of, first member recess 224 onto windshield 102, generally horizontal relative windshield but in abutting contact therewith, into first engagement configuration 226 in which member 220 is no longer retained disengaged configuration 225 by electromagnet 232.

In first engagement configuration 226, member 220, no longer retained by electromagnet 232, may freely rotate between configurations 226, 228, 230 and slides along windshield in abutting contact therewith during displacement of wiper blade 106, by wiper arm 108, through wiping plane with wiper blade 106 in abutting contact with windshield 102. Engagement stop 204 stop has an abutment protrusion 244, protruding thereacross on a top stop side 260 thereof, generally opposite bottom stop side 262 thereof attached to windshield 102, typically between two guiding ramps 248a, 248b which taper upwardly towards, respectively, opposing abutment ridges 245a, 245b defined by abutment protrusion 244. Optionally, guiding ridges 254 could protrude upwardly on opposing sides of guiding ramps 248a, 248b and taper upwardly to abutment protrusion 244. Engagement stop 204 is positioned on windshield 102 such that, as wiper blade 106 is forwardly displaced towards top of windshield 102 through wiping plane with wiper blade 106 in abutting contact therewith, abutment lip 240, extending across free end 242 of member 220, enters into mating abutting contact with first abutment ridge 244 of engagement stop 204. Further, engagement lip 240 is typically tapered inwardly towards wiper arm 108, i.e. away from wiper blade 106, at an angle such that the entirety of lip 240 may abuttingly contact abutment ridges 245a, 245b while wiper blade 106 is displaced through wiping plane. Typically, the engagement lip 240 has a generally rounded cross section to ensure proper engagement with and release from the respective ridges 245a, 245b.

Figure 15:
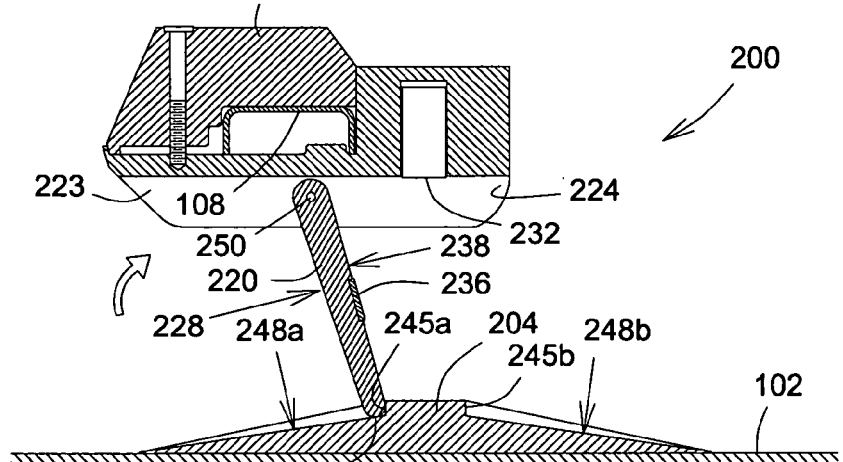
FIG. 15 is a side view of the a snow removal and deicing device, taken along line 13-13, with the pivoting member thereof in a vertical configuration.
Figure 16:
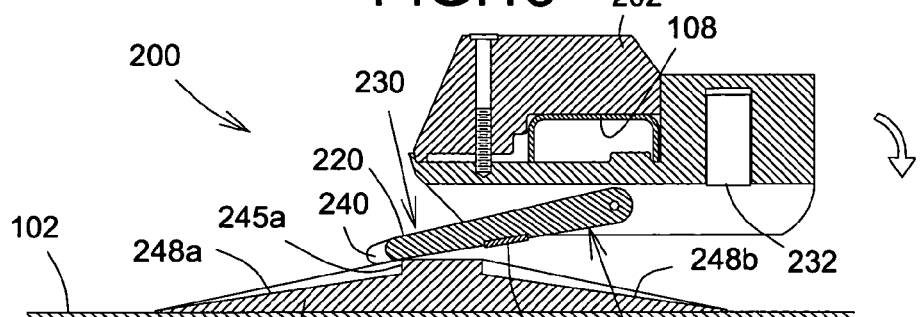
FIG. 16 is a side view of the a snow removal and deicing device, taken along line 13-13, showing a pivoting member thereof descending from the vertical configuration towards a second engagement configuration.
Figure 17:
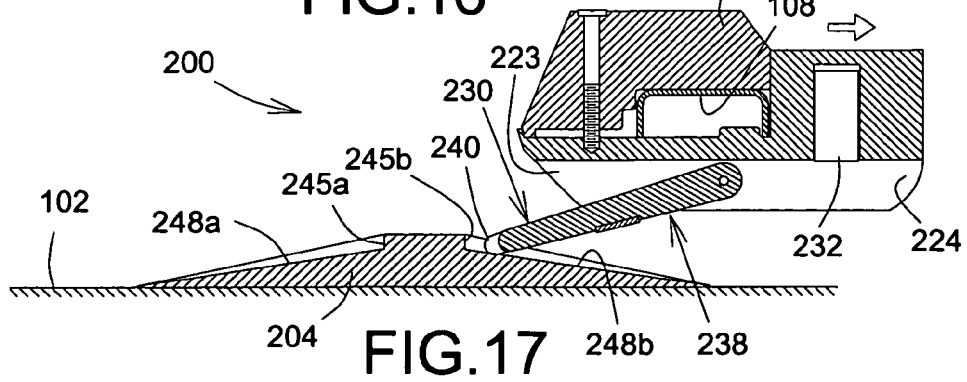
FIG. 17 is a side view of the a snow removal and deicing device, taken along line 13-13, with a pivoting member thereof in a second engagement configuration.

As main body 202, with pivoting member 220 in first engagement configuration 226, moves into abutting contact with engagement stop 202 during forward displacement of wiper blade 106 through wiping plane, member 220, and in particular abutment lip 240, is guided in sliding abutting contact with ramp 248a slightly upwardly towards first abutment ridge 245a. As shown in FIG. 15, as the forward displacement continues, abutment lip 240 enters abutting contact with abutment ridge 245a and forward displacement of wiper 100 causes member 220 to pivot, with lip 240 and ridge 245a in abutting contact, into vertical configuration 228, in which member 220 is oriented substantially perpendicularly to windshield 102, thus raising main body 202 upwardly away from windshield 102. Consequently, wiper arm 108 and wiper blade 106 are also raised upwardly away from windshield 102 such that wiper arm is spaced apart from windshield. As forward displacement of wiper blade 106, by wiper arm 108, in wiping plane continues, pivoting member 220 continues to pivot on member pin 250 and gravity, and/or a wiper biasing spring, not shown, attached to wiper arm 108, draws wiper 100 back towards windshield and wiper blade 106 back into contacting engagement with windshield 102, providing impact to remove snow and ice from wiper blade 106. Concurrently abutment lip 240 is drawn over abutment protrusion 244, as shown in FIGS. 16 and 17, in abutting contact therewith, by the forward displacement and falls into second horizontal engagement configuration 230 shown in FIG. 16, in which pivoting member 220 is substantially horizontal windshield. Pivoting member 220, and notably abutment lip 240, is guided downwardly away from second abutment ridge 245b in sliding abutting contact with guiding ramp 248b. Forward displacement of wiper 100 then draws pivoting member 220 off engagement stop 204 in second horizontal engagement configuration 230 and along windshield 102 in sliding abutting contact therewith until forward displacement through wiping plane reaches the forward limit, i.e. the apex, of the wiping plane. As shown, in second horizontal engagement configuration, pivoting member 220 extends across second wiping recess 223 with first member wall 238 facing away therefrom towards windshield 102.

When wiper reaches forward limit of wiping plane, reverse displacement of wiper commences towards bottom of windshield 102, drawing main body 202 with pivoting member 220 in second engagement configuration 228 towards engagement stop 204. As wiper arm passes over engagement stop 202 during reverse displacement through wiping plane, pivoting member 220, and notably engagement lip 240 traverses ramp 248b, in sliding abutting contact therewith, between guiding ridges 54 until lip 240 comes into contact with abutment ridge 245b. Reverse displacement of wiper 100 then causes pivoting member 220 to pivot upwardly into vertical configuration 228 with abutment lip 240 in abutting contact with second abutment ridge 245b, thus raising wiper arm 108 and wiper blade 106 away from windshield 102, and then into first engagement configuration 226 as pivoting member 220, and notably abutment lip 240 thereof is disengaged from abutment ridge 245b, thus causing wiper blade 106 to fall and impact the windshield 102. Main body 202 is then drawn along first ramp, away from protrusion 244, with pivoting member 220, and notably abutment lip 240 being drawn in sliding abutting contact with first ramp 248 and then windshield 102. This cycle of lifting wiper arm 108 and blade 106 with pivoting member 220 during forward and reverse displacement of wiper 100 in wiping plane continues until electrical current is restored, i.e. circulated again, to electromagnet 232 and pivoting member 220 is within a range, i.e. sufficient proximity, thereof such that electromagnet 232 may draw pivoting member 220, by acting on metal plate 236, back into disengaged position 225. Accordingly device 200 is actuated by terminating circulation of electric current to electromagnet 232 and deactuated by restoring electric current to electromagnet 232, preferably when pivoting member is in first engagement configuration 226. Maintaining the electromagnet 232 powered while the pivoting member 220 is in the stowed disengaged configuration 225 has the advantage of producing some heat therearound that keeps the device 200 free from accumulation of ice or snow thereon.

It should be noted that cover 206 may be retained on body 210 by means other than screws 208. For example, clasps, clamps, or any other type of fastener that can attach cover 206 to body 210 with sufficient strength to maintain wiper arm 108 held securely therewithin. Further, retaining means could, for example, involve magnetic devices of different configuration. For example, metal plate 236 could be polarized metal having a first polarity and electromagnet 232 could be configured to switch between an opposing second polarity, relative first polarity, and first polarity. Accordingly, device 200 would be engaged to lift wiper by shifting polarity of electromagnet 232 from second polarity to first polarity to repel plate 236, and thereby pivoting member 220, away from electromagnet 232 into first horizontal engagement configuration 226. Conversely, polarity would be shifted from first polarity to second polarity to attract pivoting member 220, by action of electromagnet 232 on metal plate 236 to restore pivoting member 220 to disengaged configuration 225. Additionally, device 200 could have more than one metal plate 236 and could have electromagnets 232 disposed in both recesses 223, 224, which would permit pivoting member 220 to be held in disengaged configuration 225 in either recess 223, 224.

Although the present invention has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. A windshield wiper snow removal and deicing device for raising a windshield wiper blade mounted on a wiper arm away from a windshield, upon which the wiper blade is otherwise maintained in abutting contact therewith by a wiper biasing spring connected to the wiper arm, such that the wiper blade falls down and impacts the windshield, the wiper blade defining a wiping plane in which the wiper wipes snow and ice on the windshield in abutting contact therewith, said device comprising:

a motor mountable on the wiper arm;
   a rotating shaft oriented substantially parallel to the wiping plane and rotated by said motor when said motor is actuated;
   at least one flap member partially, freely rotatably mounted on said rotating shaft and oriented generally radially thereto for selective abutting contact on the windshield; and
   a motion transmitting member connected to said rotating shaft for imparting rotation, when said motor is actuated, of said rotating shaft to said flap member such that said flap member moves from a horizontal rest position in which said flap member is substantially parallel to the to a vertical working position, said wiper blade passing unobstructed through the wiping plane in contacting engagement with the windshield when said flap member is in said horizontal rest position, and the vertical working position in which said flap member abuttingly engages the windshield and raises the wiper blade thereabove, said motion transmitting member allowing partial free rotation of said flap member from said vertical working position back to said horizontal rest position.

2. The device of claim 1, wherein said at least one flap member is comprised of a flexible resilient material.

3. The device of claim 1, further comprising a drive collar freely rotatably mounted on said rotating shaft, said at least one flap member being attached to said drive collar and extending therefrom, said flap member being freely rotatably mounted on said rotating shaft thereby.

4. The device of claim 3, wherein said motion transmitting member comprises a first cog protruding radially outwardly from said shaft, said first cog abuttingly contacting said drive collar during said rotation from said horizontal resting position to said vertical rotating position.

5. The device of claim 4, wherein said drive collar comprises a second cog protruding towards said rotating shaft, said first cog abuttingly engaging said second cog to rotate said flap member from said horizontal rest position into said vertical working position.

6. The device of claim 1, further comprising a housing within which said motor and said rotating shaft are housed, a portion of said rotating shaft having said motion transmitting member connected thereon protruding sealingly outside of said housing through a housing aperture of said housing, said at least one flap member being mounted on said portion.

7. The device of claim 6, wherein said housing is made of a durable weather resistant material.

8. The device of claim 1, wherein said at least one flap member comprises two flap members.

9. The device of claim 8, wherein said flap members are of substantially similar length.

10. The device of claim 8, wherein said flap members extend generally oppositely away from one another.

11. The device of claim 1, further comprising a vibrating member connected to said motor, said vibrating member vibrating said device and the wiper blade when said motor is actuated, thereby facilitating removal of the snow and ice.

* * * * *